2,990,616
ULTRASONIC CUTTING TOOL
Lewis Balamuth, Sunnyside, and Arthur Kuris, Bronx, N.Y., assignors to Cavitron Corporation, a corporation of New York
Filed Mar. 8, 1955, Ser. No. 492,924
6 Claims. (Cl. 32—26)

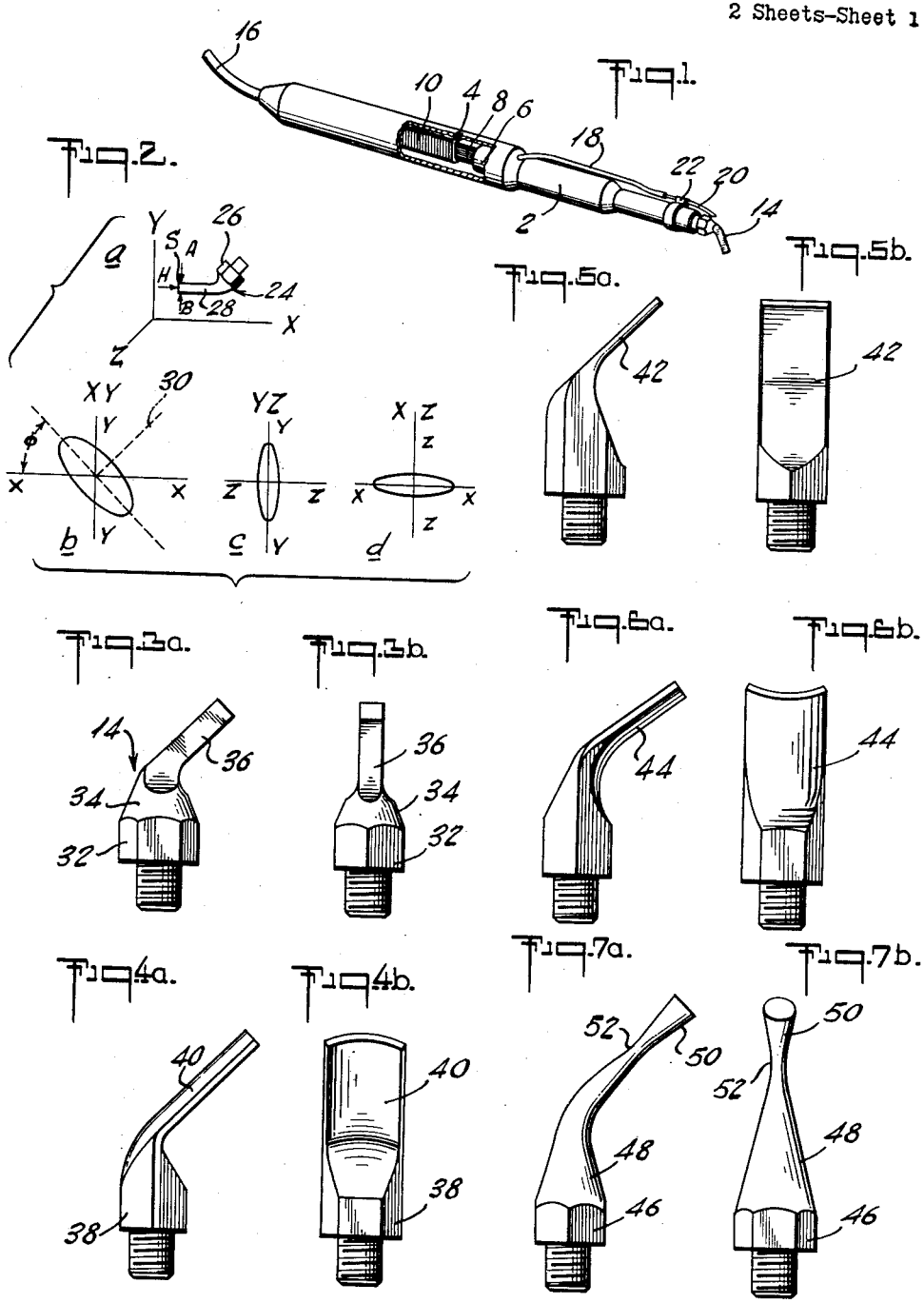

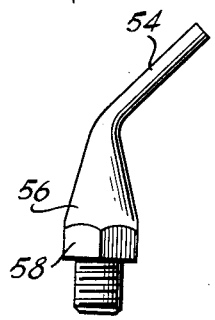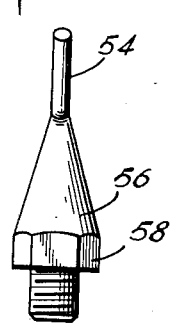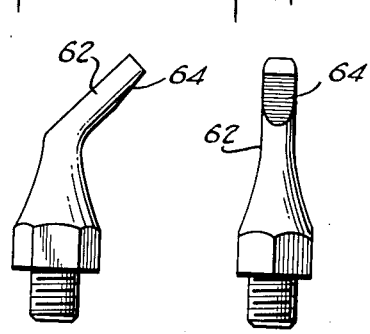
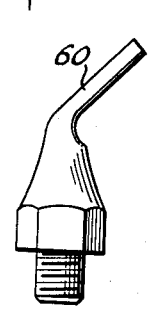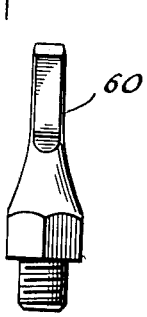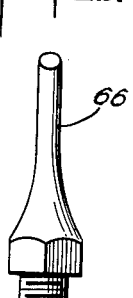
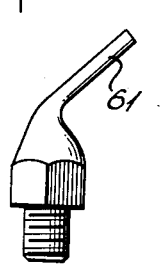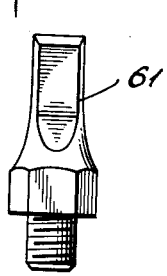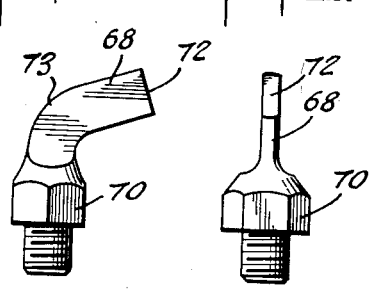

The present invention relates to sonic and ultrasonic cutting processes and comprises novel tools for use in such processes. The new tools are particularly adapted for use with hand operated ultrasonic devices, as for example, those employed in ultrasonic dental cutting operations.

In sonic or ultrasonic cutting, in accordance with the process disclosed and claimed in Balamuth U.S. Patent No. 2,580,716, a tool is formed having an end of the shape or conformation of the desired hole or cavity, and this tool is connected to a device which will cause the tool end to oscillate at a very high frequency and low amplitude. The tool end is pressed against the material to be cut (e.g., tooth structure) and a suspension of finely divided abrasive in an appropriate liquid (water) is flowed around the under end of the tool on the face of the surface to be cut. At the frequencies employed (in excess of 400 cycles per second) ordinarily no movement of the tool end is visible to the naked eye and this is particularly true because the amplitude of movement of the tool end is necessarily small, certainly not in excess of .05" and ordinarily very much less. Even though no movement of the tool end is visible, it will soon be noted that the tool, under light and continuous pressure, sinks into the material to be cut and eventually a hole or aperture in the workpiece is formed of a shape or cross section corresponding directly to the shape of the tool end. As disclosed in the Balamuth Patent 2,580,716, col. 3, lines 23–27; col. 6, lines 47–52, the small longitudinal amplitude of vibrations employed is sufficient to produce accelerations of at least 1,000 times the acceleration due to the force of gravity (32.2 ft. per sec.) in the frequency range of 8,000 to 30,000 cycles per second.

The cutting tools of the present invention are characterized by a base section designed for rigid attachment to a tool holder in the form of an acoustical impedance transformer operative to inject longitudinal vibrations into the base section in a direction parallel to the axis of symmetry of the base section, and a tip section whose axis of symmetry extends at an angle to the axis of symmetry of the base section, with the tip section merging into the base section transitionally in a gradually increasing taper. This cutting tool is so shaped and dimensioned that, when longitudinal vibrations in the order of 8,000 to 30,000 cycles per second are injected into the base section in a direction parallel to its axis of symmetry, flexural vibrations will be produced at the free end of the tip section.

Due to the flexural vibrations thus produced, vibrations of the terminal end and adjacent side portions of the tip section are generally elliptical in form and can be effectively used to cut cavities in hard materials not only in the direction of penetration of the tool into the material being cut, but also laterally with respect to the direction of penetration to thereby enlarge the cavity. Thus, by pressing the end of the tip section of these cutting tools into a tooth structure or other material, a cavity may be formed, and by pressing a side portion adjacent the end of the tip section against a side wall of the opened cavity, the cavity can be laterally enlarged or opened up.

The fundamentally important elliptical motions produced at the free end of the tip section of the cutting tool constructed in accordance with this invention are completely unexpected, and after extensive experimentation were found to arise from the use of a cutting tool whose base section was of greater cross-sectional area than the mean cross-sectional area of the tip section whose axis of symmetry extends at an angle to the axis of symmetry of the base section, with the tip section joined to the base section transitionally in a gradually increasing taper. In the absence of such taper in a tool whose tip section extends at an angle to the base section, the induced flexural vibrations combine with the longitudinal vibrations in a linear pattern rather than an elliptical pattern.

Cutting tools constructed in accordance with this invention have the great advantage of enabling the operator to apply the end and adjacent side portions of the tip section against one or more selected sides of the cavity being cut and thereby effect lateral enlargement of the cavity as desired, by utilizing the to and fro elliptical movements of the free end of the tool, without reorientating the instrument with respect to the lateral surface to be cut or replacing the tool bit.

By the use of cutting tools made in accordance with this invention, relatively hard and brittle materials such as carbides, gem stones, glass, ivory and the like can be cut with blunt tools or softer materials. As indicated above, these tools may be employed for cutting teeth, and apparatus for use by dentists has been developed wherein the transducer and tool holder are relatively small size and are contained within a hand piece coupled through flexible tubing to a suitable source of high frequency electrical oscillations and of D.C. bias current and to water inlet and outlet conduits for delivery of cooling fluid to the transducer. The tool holder is provided at its end remote from the transducer with means for detachably securing tool bits thereto. Although the new tools of the present invention are particularly adapted for use with such dental equipment and will therefore be described with particular reference to such use, the principle of the invention, as embodied in such tool bits or tips, is equally applicable to any tool operating in accordance with the process of the said Balamuth patent.

The new tools or tool bits are characterized in general by an ability to cut in more than one direction, the particular cutting direction or directions depending upon the shape of the tool bit and upon the direction in which the tool is pressed against the work by the operator. The new tools are also characterized by a lack of symmetry with relation to the axis of the tool holder and in general by a construction such that longitudinal vibrations introduced therein stimulate flexural vibrations of the tool tip. In certain of the tools embodying the invention the amplitude of vibration of the working end of the tool differs from that of the end of the tool holder to which the tool is attached, in some cases the tool holder acting to increase the amplitude of vibration.

For a better understanding of the invention and of particular constructions of tools embodying the invention reference may be had to the accompanying drawings of which:

FIG. 1 is a side view partly in longitudinal section of the hand piece of an ultrasonic dental cutting apparatus having attached thereto a tool bit embodying the invention;

FIG. 2 is a series of diagrams explanatory of operating characteristics of tool bits embodying the invention; and FIGS. 3a, 3b through 13a, 13b are views of tool bits representing embodiments of the invention, each tool bit being shown in two mutually perpendicular views.

A hand piece of an ultrasonic cutting equipment illustrative of the type with which the new tool is suitable for use is shown in FIG. 1 as comprising an outer casing 2 enclosing a magnetostrictive transducer 4 and tool holder 6 operating as an acoustical impedance transformer, the tool holder being welded or otherwise firmly secured at one end to an end of the laminated stack 8 of magnetostrictive material forming part of the transducer. The winding 10 of the transducer is connected through a cable to a suitable source (not shown) of high frequency electrical oscillations and to a source (not shown) of D.C. bias current. The tool holder 6, at the end remote from the transducer, is provided with an axial threaded aperture for reception of the threaded stud of a tool bit 14. A flexible sheath 16 encloses the cable, capillary tubing for delivery of the abrasive slurry to the work area and also suitable water delivery and exhaust tubing for cooling the transducer. The capillary tubing 18 for the slurry is brought out of the casing 2 through a suitable opening therein and extends to a nozzle 20 mounted by means of a ring 22 on the casing 2. The overall length from the free end of the transducer to the tip of the tool bit is so correlated to the frequency of the generated longitudinal vibrations at the operating frequency that maximum amplitude of vibration will occur at or near the tip of the tool. This condition is satisfied when such length is substantially an integral number of half wavelengths of sound in the material of the transducer stack or vibrator member 8, tool holder 6 and bit 14, at the operating frequency. An operating frequency of the order of 29 kc. for a dental equipment is convenient as such frequency permits use of a relatively short hand piece, in the neighborhood of 8″ or less. The tool holder 6 provides a connecting body between the magnetostrictive transducer stack or vibrator member 8 and the tool bit 14, and is sometimes referred to in the art as an acoustical impedance transformer, since it operates to magnify the amplitude of vibrations transmitted to it by the transducer stack 8 so that a maximum amplitude of vibration will occur at or near the tip of the tool 14 at the operating frequency.

It will be appreciated that where the instrument with which the tool bit 14 is associated is designed to be held in the hand as in the case of a dental instrument, it would be limited in length and in the approximate order of only eight inches. Accordingly, it is apparent that the total length of the vibrator unit, comprising the vibrator member 8, tool holder 6 and bit 14 operating in the ultrasonic frequency range of approximately fifteen thousand to thirty thousand cycles per second, would correspond to only a relatively few half wavelengths of sound in the material of the vibrator unit. Thus the vibrator member 8 may have a length approximately equal to one-half wavelength, and the combined length of the connecting body 6 and bit 14 may have a length of approximately only one-half wavelength, and with the length of the tool bit 14 corresponding to one-quarter wavelength or less.

Tool bits embodying the invention, such as the tool bit 14 of FIG. 1, are so constructed that when the transducer is energized at the operating frequency the longitudinal vibrations of the tool holder stimulate both longitudinal and flexural vibrations of the tool tip. Flexural vibrations are created because the center of gravity of the tool bit is not on the extended axis of the tool holder and also because the tool bit itself has a natural resonant frequency in the neighborhood of the frequency band employed for energization of the transducer. Such tool bits are capable of use for cutting in more than one direction. Depending upon the particular configuration the cutting may be performed equally well in three different directions or there may be one particular direction in which cutting is more rapid with two other directions of lesser and equal or unequal cutting rates. Tool bit 14 of FIG. 1 is shown in larger scale in FIGS. 3a and 3b and will be described more fully hereinafter.

In the tool bits to be described, the direction of the flexural vibrations at the tool tip is not parallel to the direction of the longitudinal vibrations and hence optimum cutting is not in the direction of the extended axis of the tool holder. The direction of optimum cutting is dependent upon the material employed for the tool bit, upon its cross section, and upon the displacement of the tip relative to the extended axis of the tool holder. Also the amplitude or direction of vibration of the tool tip as compared to the end of the tool holder varies in accordance with the configuration of the tool bit. In some cases amplification occurs and in some cases change in direction only occurs. Each of the new tool bits is of particular utility in dental cutting operations and each of the tool bits to be described can cut effectively in more than one direction. By effective cutting is meant a cutting rate in glass above two mils per second. The size of work area of the tool naturally affects the cutting rate, the larger the work area the slower the cutting rate because of the greater volume of the work material to be removed. Each tool bit of the invention, when pressed against glass in the direction of effective cutting, will cut at a rate of at least two mils per second.

Operating characteristics of tool bits embodying the invention will be explained with reference to the diagrams of FIG. 2. In FIG. 2, at $a$ a tool bit 24 which for present purposes may be considered as symbolizing any tool bit of the invention, is shown as so oriented with respect to mutually perpendicular axes X, Y and Z that the end face of the tip lies in a plane parallel to the YZ plane, the axis of the base 26 (which when the tool is fastened to the tool holder coincides with the extended axis of the tool holder) lies in the XY plane at an angle to the X axis and the axis of the end portion 28 lies in the XY plane and is parallel to the X axis.

At $b$, $c$ and $d$ in FIG. 2 are shown typical traces in three mutually perpendicular planes of excursions of points at the tip of the tool bit when the tool bit is vibrating under the stimulus of ultrasonic longitudinal vibrations introduced into the base from the tool holder. A trace such as that of FIG. 2$b$ is obtained by examining under a microscope and recording the light trace or path of movement of a sighted point source on the side S of the tool tip adjacent the end face H of the tool tip. The trace of FIG. 2$c$ is similarly obtained from a sighted point source on the face H of the tool tip and the trace of FIG. 2$d$ is obtained from a sighted point source near the face H on the undersurface B of the tip. The traces in $b$, $c$ and $d$ of FIG. 2 show that the movement of the tool tip, or more specifically of a point at or near the tip, is primarily an elliptical movement in a plane parallel to the XY plane and that there is but little movement in a direction parallel to the Z axis. The major axis of the ellipse of FIG. 2$b$ is inclined at an angle $\phi$ to the X axis and is substantially perpendicular to the extended axis of the base section of the tool bit, indicated by the dashed line 30.

As the results of tests of tool bits embodying the invention and of examination of traces such as those of FIG. 2 obtained from the tested bits it can be stated qualitatively that for effective cutting in the $-X$ direction, that is with the face H pressed against the work, the following conditions seem to be indicated.

(1) The trace in the XY plane must be elliptical.

(2) The length of the major axis should not be substantially less and preferably should be greater than the length of a trace obtained by measuring the excursion at a point source at the base of the bit (such trace would be parallel to line 30).

(3) The excursions of the traces in the YZ and XZ planes parallel to the Z axis should be small, usually less than one-half the length of the major axis of the ellipse in the XY plane.

(4) The smaller the angle $\phi$ between the major axis of the ellipse in the XY plane and the X axis, the higher the cutting rate in the X direction.

Similar conditions apply for effective cutting in the + and −Y directions, except that effective cutting in such directions increases, rather than decreases, with increase in angle $\phi$.

For mechanical strength the tip section of a tool bit should have a smaller area than the cross sectional area of the base section of the bit and the bit should have a gradual taper somewhere along its length, preferably between the base and the portion which is angularly disposed with respect to the extended axis of the base. The optimum configuration of a tool bit will depend upon the particular use to which it is to be put, that is upon the shape of the cavity it is to make or upon the direction or directions in which most effective cutting is desired. In most cases some ability to cut in the −X direction is an advantage as with such a tool bit, so that initial penetration of a tooth, or other work, can be made which in effect, gives a "toe-hold" to the tool from which cutting in the Y directions can be initiated.

Performance of the specific tools of FIGS. 3a–3b to FIGS. 13a–13b, when ultrasonically vibrated at speeds in the order of 29 kc., will now be given together with dimensional data, all of which should be considered as illustrative only.

The tool bit of FIGS. 3a and 3b which, as heretofore indicated, is the tool bit 14 shown in FIG. 1, comprises a 3/16" hexagonal base 32 having a generally conical dome 34 from which extends at an angle of approximately 45° a bar 36, 9/32" long and of square cross section (.062" x .062"), the parts 32, 34 and 36 being formed from a single metal piece. The length from the bend to the end of the threaded stud is 3/8". This tool bit is particularly adapted for use by a dentist in boxing, that is, in preparing cavities of rectangular cross section. A tool bit of the above dimensions had a cutting rate in the −X direction of 4.7 mils per second, in the −Y direction of 4.0 mils per second and in the +Y direction of 5.0 mils per second. The major axis of the ellipse in the XY plane was .0014" as compared to the excursion of .0012" of a point on the base. The major axis of the ellipse in the XY plane lay in the first and third quadrants at an angle of 60° to the X axis. In the YZ and XZ planes the traces showed excursion in the + and −Z directions of .0004". An operator using the tool of FIGS. 3a and 3b in dental equipment can advance the tool into the work in the X direction for initial formation of a cavity with the cross section of the member 36. The hand piece may then be moved to advance the tip of the tool bit in the +Y direction to widen the cavity in that direction or the operator may advance the tool in the −Y direction also to widen the cavity.

A tool bit suited primarily for slicing is illustrated in FIGS. 4a and 4b. In this embodiment of the invention the tool bit comprises a hexagonal base 38 tapered into a blade element 40 of arcuate cross section and inclined at an angle of substantially 45° to the extended axis of the stud, the blade 40 being convex as viewed from the tip end of the bit. The blade is 19/64" long, .021" thick and 3/16" wide. The junction of the blade with the base is 7/16" from the end of the threaded stud. The trace in the XY plane was an ellipse with a major axis of .0014" compared to an excursion at the tool base of .0012". The major axis lay in the first and third quadrants at an angle of 45° to the X axis. The traces in the XZ and YZ planes showed zero Z excursions. The cutting rate in the −X direction was 6.2 mils per second. Cutting in the + and −Y directions was at rates substantially less than in the −X direction. The tool of FIGS. 4a and 4b is suitable for use when sections of the shape of the cross section of the blade 40 are to be removed.

The tool bit of FIGS. 5a and 5b is generally similar to that of FIGS. 4a and 4b except that it is a flat slicer rather than a convex slicer. As the extended blade portion 42 thereof is not curved in cross section, there will be a greater flexural vibration at the tool tip. The blade is 3/8" long, .01" thick and 3/16" wide. The junction of the blade with the base is 11/32" from the end of the stud. This tool bit cut in the −X direction at the rate of 3.6 mils per second, in the +Y direction at the rate of 4.2 mils per second and in the −Y direction at the rate of 2.9 mils per second. The trace in the XY plane was an ellipse with a major axis of .0018" compared to an excursion of .0014" at the base. It lay in the second and fourth quadrants at an angle of 55° to the X axis. The + and −Z excursion in each of the XZ and YZ planes was about .0002".

Another tool of the same general type, designated as a concave slicer, is shown in FIGS. 6a and 6b. This tool differs from that of FIG. 4a in that the blade or plate portion 44 thereof is concavely curved looking down at the tip of the bit. The blade is 3/8" long, .021" thick and 3/16" wide. The base is 13/32" long. The tool cut in the −X direction at the rate of 4.9 mils per second and at lesser rates in the + and −Y directions. The trace in the XY plane was an ellipse with a major axis of .0012" compared to a base excursion of .0014". The major axis of the ellipse lay in the first and third quadrants of an angle of 40° to the X axis.

The tool bit of FIGS. 7a and 7b is particularly designed for undercutting. It comprises a hexagonal base 46 merging into a tapered portion 48 of decreasing circular cross section which in turn merges into an end portion 50 of increasing circular cross section, the upper half of the portion 48 and end portion 50 being inclined at an angle of approximately 45° to the extended axis of the threaded stud. The diameter of the tip is .080", the length of the portion 50 together with the part of the portion 48 beyond the bend therein is 1/4" and the length of the base up to the bend in the portion 48 is 19/32". Although the trace in the XY plane was an ellipse with its major axis inclined through an angle of 15° to the X axis, the tool would not cut effectively in the −X direction. The tool cut at the rate of 3.1 mils per second in the −Y direction and at the rate of 2.1 mils per second in the +Y direction. There was substantially no excursion of the trace in the + or −Z directions in either of the YZ or XZ planes. It is believed that the reason that the tool is ineffective to cut in the −X direction is because the liquid carried abrasive, during attempted cutting, tends to move away from the tip of the tool toward the region 52 of least diameter. In the absence of abrasive between the working surface of the tool and the work area cutting according to the process of the said Balamuth patent can not, of course, be achieved. For the purpose of the tool of FIGS. 7a and 7b, namely, undercutting, the inability of the tool to cut in the −X direction is an advantage. In undercutting the operator wishes only to widen a cavity and not to increase its depth. Accordingly in practice one of the other illustrated tools would be employed to make a cavity of desired depth. The tool of FIGS. 7a and 7b would then be employed to widen the cavity without danger of increasing its depth. Thus in addition to the heretofore suggested criteria for construction of a dental tool, there is the additional requirement for design of a tool adapted to cut effectively in the −X direction, namely, that the area of the tip should not taper from a large to a small cross sectional area as one moves back from the cutting end and, conversely, if no cutting is desired in the −X direction the cross sectional area of the tip should taper from a larger to a smaller cross sectional area as one leaves the cutting end.

In FIGS. 8a and 8b the tool bit illustrated has a cylindrical rod-like portion 54 of .041" diameter and of a length of 23/32" which is inclined to the axis of the threaded stud portion through an angle of substantially 45°, the rod 54 merging through a conical section 56 into the hexagonal base 58. The length from the junction of the rod portion to the end of the stud is 23/32". The trace in the XY plane was an ellipse with the major axis thereof lying in the first and third quadrants at an angle of 65° to the X axis and of a length of .0012" as compared to an excursion at the base of .0013". The tool cut in the —X direction at a rate of 3.8 mils per second and also cut effectively in the + and —Y directions. A tool of the general configuration of that of FIGS. 8a and 8b but with a rod length of 21/64" and a base length of 17/32" was found to be ineffective to cut in the —X direction. The trace in the XY plane of such tool was a straight line and not an ellipse. Thus the requirement that the trace be an ellipse is demonstrated by the results obtained with these two very similar tools.

In FIGS. 9a and 9b another tool bit suitable for boxing is illustrated. The tool is generally similar to that of FIGS. 3a and 3b except that the angularly disposed portion 60 thereof has curved side edges and is flat on the top and on the bottom. It is 17/64" long, .036" thick and .081" wide. The length of the base and stud is 25/64". The trace in the XY plane was an ellipse with its major axis lying in the second and fourth quadrants at an angle of 30° to the X axis and of a length of .0017" as compared to the excursion at the base of .0016". The excursions in the + and —Z directions of the traces in the YZ and XZ planes were under .0002". The tool cut in the —X direction at a rate of 11.3 mils per second and at lesser rates in the + and —Y directions. Cutting with this tool prior to bending of the tip thereof yielded a cutting rate of 3.0 mils per second. The trace of such straight tool in the XY plane was a straight line of a length of .0016". The increase in cutting rate of the bent tool compared to the straight tool is thus clearly demonstrated by the change in cutting rate from 3.0 mils per second to 11.3 mils per second.

In FIGS. 10a and 10b another tool suitable for use as a flat slicer is illustrated. The width of the inclined portion thereof is .120", the thickness .031" and the length 21/64". The length of the base is 17/64". The trace in the XY plane was an ellipse with the major axis in the second and fourth quadrant disposed at an angle of 45° to the X axis and of a length equal to .0014" equal to the excursion at the base. The cutting rate in the —X direction was 4.5 mils per second. The tool was ineffective to cut in the Y direction. After wear of the tool of .03" cutting rate in the —X direction decreased to 1.3 mils per second but the rate in the —Y direction increased to 3.6 mils per second. The elliptical trace in the XY plane after wear had a larger major axis which was almost coincident with the Y axis.

The tool shown in FIGS. 11a and 11b is another boxing tool and is similar to that of FIGS. 9a and 9b. The width of the inclined portion 62 thereof is .080", the thickness .045" and the length ¼". The length of the base is 13/32". The section 62 is planed off to provide a flat portion 64. This tool cut in the —X direction at a rate of 8.6 mils per second, in the —Y direction at a rate of 7.5 mils per second and in the +Y direction at a rate of 6.8 mils per second. The trace in the XY plane was an ellipse with a major axis of .0012" lying in the second and fourth quadrants at an angle of 45° to the X axis. The excursion at the base was .0010". The Z excursion at the base was .0010". The Z excursions in the XZ and YZ planes were under .0002".

In FIGS. 12a and 12b a tool generally similar to that of FIGS. 8a and 8b is illustrated. The diameter of the rod portion 66 is .086", the length thereof 9/32" and the length of the base 15/32". The tool cut in the —X direction at a rate of 4.4 mils per second and at lesser rates in the + and —Y directions.

In FIGS. 13a and 13b a tool bit useful for slicing is shown. In this bit a blade 68 is formed integral with a hexagonal base section 70, the blade 68 curving away from the axis of the threaded stud and terminating in a straight edge 72, the inclination of the blade to the extended axis of the stud being 65°. The blade is .050" thick, ⅛" wide and 7/16" long, measured from the bend 73 to the tip. The base is 11/32". The tool cut in the —X direction at a rate of 4.6 mils per second, in the —Y direction at a rate of 6.4 mils per second and in the +Y direction at a rate of 4.2 mils per second. The major axis of the elliptical trace in the XY plane was .0012" as compared to an excursion at the base of .0009". The major axis lay in the first and third quadrants at an angle to the X axis of 60°.

From the foregoing description of tool bits which embody the invention and which have been found to be effective in dental operations, it will be apparent that while the cutting tools of this invention may have various configurations to adapt each of them to a particular purpose, the tip section of each of these tools is relatively short as compared to the combined overall length of the vibrator member 8 and connecting body 6, and each cutting tool comprises a relatively heavy base section fixed to the connecting body and which merges through a tapered bend portion into an elongated tip section of substantially lesser cross-sectional area than the base section, with the axis of the tip section inclined at an angle of less than ninety degrees to the extended axis of the base section. From the dimensional attributes of the tip sections as exemplified in the examples given above, it is also evident that the axial length of each tip section as measured from the bend portion to the terminal end thereof is not less than one-quarter of the flexural wavelength in the material of the tip section at the operating frequency, and that each tip section has at least one node of flexural vibration between the terminal end of the tip section and the tapered bend portion of the cutting tool. The cutting tools of this invention cut effectively in the direction of the length of the elongated tip section (unless there is a minimum cross-section in some region of the tip section intermediate the bend portion and the terminal end thereof as shown in FIGS. 7a–7b and also cut in a direction at right angles to the axis of the tip section. The rate of cutting in these latter directions depends upon the rigidity, that is, upon the cross sectional configuration of the angularly disposed tip section of the tool bit, as well as upon the length and thickness thereof. Obviously, although a relatively large number of tool bits embodying the invention have been illustrated and described, the invention is not limited to the specific tool configurations illustrated as the principle of the invention could be readily embodied in tools of other configuration.

In cases where the cutting tools are designed to have substantially perfect mirror symmetry about the plane containing the extended axis of the connecting body and the axis of the inclined tip section of the cutting tool, there would be substantially no excursion of the traces in the direction of the Z axis, and no effective cutting would be expected in either the + or —Z direction. It will be clear, however, that the principle of the invention is also applicable to the construction of tool bits which cut not only in directions lying in the XY plane or in planes parallel thereto, but also in directions perpendicular to such planes. Such ability to cut in three dimensions is achieved by giving the intermediate bend portion of the tool a skew or double bend configuration, so that the medium line of the tool bit does not lie in any one plane.

The following is claimed:

1. An ultrasonically vibrated dental instrument which includes, a tubular handpiece, a magnetostrictive transducer including a biased alternating current winding surrounding a magnetostrictive vibrator member contained within said tubular handpiece and designed to vibrate at a resonant frequency in the range of approximately fifteen thousand to thirty thousand vibrations per second, a connecting body operating as an acoustical impedance transformer rigidly fixed to one end of said vibrator member and contained within said tubular handpiece, and a dental tool having a base section rigidly secured to the other end of said connecting body, said base section having its axis of symmetry substantially in longitudinal alignment with the axis of symmetry of said connecting body and designed to receive longitudinal vibrations from the energized vibrator member and connecting body in a direction substantially parallel to the axis of symmetry of the base section, and a tip section integrally joined to said base section by a bend portion which tapers transitionally from said tip section into said base section with the axis of symmetry of said tip section inclined to the axis of symmetry of said base section at an angle of approximately thirty to seventy degrees, said tip section having substantially similar cross-sectional areas at the end portions thereof which are less than one third the cross-sectional area of said base section, said tip section having an axial length which is more than three times the maximum thickness of the tip section and effective to produce substantially resonant frequency of flexural vibration along the length of the tip section which corresponds to the resonant frequency of longitudinal vibration at which the joined vibrator member, connecting body and dental tool are operated; the longitudinal vibrations of said connecting body as driven by the energized vibrator member being operative to produce both longitudinal and flexural vibrations of substantially the same resonant frequency at the terminal end of said tip section to thereby cause the terminal end of the tip section to trace a generally elliptical path of sustained movement with the minor diameter of the ellipse not less than one-tenth of the major diameter.

2. An ultrasonically vibrated cutting instrument which includes, a magnetostrictive vibrator member designed to longitudinally vibrate at a resonance frequency in the order of fifteen thousand to thirty thousand vibrations per second when energized by a biased alternating current field of corresponding frequency, a connecting body operating as an acoustical impedance transformer rigidly fixed to one end of said vibrator member, and a cutting tool having a base section rigidly secured to the other end of said connecting body, said base section having its axis of symmetry substantially in longitudinal alignment with the axis of symmetry of said connecting body and designed to receive longitudinal vibrations from said energized vibrator member and connecting body in a direction substantially parallel to the axis of symmetry of the base section, and a tip section integrally joined to said base section by a bend portion which tapers transitionally from said tip section into said base section with the axis of symmetry of said tip section inclined to the axis of symmetry of said base section at an angle of more than thirty degrees but less than ninety degrees, said tip section having a substantially uniform cross-sectional area along the length thereof which is less than one third the cross-sectional area of said base section, said tip section having such axial length and relative cross-sectional dimension as to produce flexural vibrations of substantially resonant frequency along the length thereof which corresponds to the resonant frequency of longitudinal vibration of the joined vibrator member, connecting body and cutting tool and which tip section length is not less than one-quarter of the flexural wavelength in the material of the tip section; the longitudinal vibrations of said connecting body as driven by the energized vibrator member being operative to stimulate combined longitudinal and flexural vibrations of substantially resonant frequency at the terminal end of said tip section to thereby cause the terminal end of said tip section to trace a sustained path of movement which is generally elliptical in form with the minor diameter of the ellipse not less than one-tenth of the major diameter.

3. An ultrasonically vibrated cutting instrument which includes, a magnetostrictive vibrator member designed to longitudinally vibrate at a resonance frequency in the order of fifteen thousand to thirty thousand vibrations per second when energized by a biased alternating current field of corresponding frequency, a connecting body operating as an acoustical impedance transformer rigidly fixed to one end of said vibrator member, and a cutting tool having a base section rigidly secured to the other end of said connecting body, said base section having its axis of symmetry substantially in longitudinal alignment with the axis of symmetry of said connecting body and designed to receive longitudinal vibrations from said energized vibrator member and connecting body in a direction substantially parallel to the axis of symmetry of the base section, and a tip section integrally joined to said base section by a bend portion which tapers transitionally from said tip section into said base section with the axis of symmetry of said tip section inclined to the axis of symmetry of said base section at an angle of more than thirty degrees but less than ninety degrees; said tip section having a substantially uniform cross-sectional area along the length thereof which is less than one third the cross-sectional area of said base section, said tip section having such axial length and relative cross-sectional dimension as to produce flexural vibrations of substantially resonant frequency along the length thereof which corresponds to the resonant frequency of longitudinal vibration of the joined vibrator member, connecting body and cutting tool and which tip section length is not less than one-quarter of the flexural wavelength in the material of the tip section; the longitudinal vibrations of said connecting body as driven by the energized vibrator member being operative to stimulate combined longitudinal and flexural vibrations of substantially resonant frequency at the terminal end of said tip section to thereby cause the terminal end of said tip section to trace a sustained path of movement which is generally elliptical in form with the minor diameter of the ellipse not less than one-tenth of the major diameter.

4. An ultrasonically vibrated cutting instrument which includes, a magnetostrictive vibrator member designed to longitudinally vibrate at a resonance frequency in the order of fifteen thousand to thirty thousand vibrations per second when energized by a biased alternating current field of corresponding frequency, a connecting body operating as an acoustical impedance transformer rigidly fixed to one end of said vibrator member, and a cutting tool having a base section rigidly secured to the other end of said connecting body, said base section having its axis of symmetry substantially in longitudinal alignment with the axis of symmetry of said connecting body and designed to receive longitudinal vibrations from said energized vibrator member and connecting body in a direction substantially parallel to the axis of symmetry of the base section, and a tip section integrally joined to said base section by a bend portion which tapers transitionally from said tip section into said base section with the axis of symmetry of said tip section inclined to the axis of symmetry of said base section at an angle of more than thrity degrees but less than ninety degrees; said tip section having a substantially uniform cross-sectional area along the length thereof which is less than one third the cross-sectional area of said base section, said tip section having such axial length and relative cross-sectional dimension as to produce flexural vibrations of substantially resonant frequency along the length thereof which corresponds to the resonant frequency of longitudinal vibration of the joined vibrator member, connecting body and cutting tool, said tip section having an axial length which is not less than one-quarter of the flexural wavelength in the material of the tip section and having at least one node of flexural vibration between the terminal end of the tip section and the tapered bend portion of the cutting tool; the longitudinal vibrations of said connecting body as driven by the energized vibrator member being operative to stimulate combined longitudinal and flexural vibrations of substantially resonant frequency at the terminal end of said tip section to trace a sustained path of movement which is generally elliptical in form with the 5. An ultrasonically vibrated dental instrument which includes, a magnetostrictive vibrator member designed to longitudinally vibrate at a resonance frequency in the order of fifteen thousand to thirty thousand vibrations per second when energized by a biased alternating current field of corresponding frequency, a connecting body operating as an acoutical impedance transformer rigidly fixed to one end of said vibrator member, and a dental tool having a base section rigidly secured to the other end of said connecting body, said base section having its axis of symmetry substantially in longitudinal alignment with the axis of symmetry of said connecting body and designed to receive longitudinal vibrations from said energized vibrator member and connecting body in a direction substantially parallel to the axis of symmetry of the base section, and a tip section integrally joined to said base section by a bend portion of skew configuration which tapers transitionally from said tip section into said base section with the axis of symemtry of said tip section inclined to the axis of symmetry of said base section at an angle of less than ninety degrees; said connecting body and dental tool fixed thereto having a combined longitudinal length which is substantially equal to one-half wavelength of a longitudinal sound wave in the material of which the connecting body and dental tool are composed at the resonance operating frequency; said tip section having a substantially uniform cross-sectional area along the length thereof which is less than one third the cross-sectional area of said base section, said tip section having such axial length and relative cross-sectional dimension as to produce flexural vibrations of substantially resonant frequency along the length thereof which corresponds to the resonant frequency of longitudinal vibration of the joined vibrator member, connecting body and dental tool, said tip section having an axial length which is not less than one-quarter of the flexural wavelength in the material of the tip section and having at least one node of flexural vibration between the terminal end of the tip section and the tapered bend portion of the dental tool; the longitudinal vibrations of said connecting body as driven by the energized vibrator member being operative to generate combined longitudinal and bi-directional flexural vibrations of substantially resonant frequency at the terminal end of said tip section with the amplitude of said bilateral flexural vibrations not less than one tenth the amplitude of said longitudinal vibrations.

6. An ultrasonically vibrated dental instrument which includes, a magnetostrictive vibrator member designed to longitudinally vibrate at a resonance frequency in the order of fifteen thousand to thirty thousand vibrations per second when energized by a biased alternating current field of corresponding frequency, a connecting body operating as an acoustical impedance transformer rigidly fixed to one end of said vibrator member, and a dental tool having a base section rigidly secured to the other end of said connecting body, said base section having its axis of symmetry substantially in longitudinal alignment with the axis of symmetry of said connecting body and designed to receive longitudinal vibrations from said energized vibrator member and connecting body in a direction substantially parallel to the axis of symmetry of the base section, and a tip section integrally joined to said base section by a bend portion which tapers transitionally from said tip section into said base section with the axis of symmetry of said tip section inclined to the axis of symmetry of said base section at an angle of more than thirty degrees but less than ninety degrees; said connecting body and dental tool fixed thereto having a combined longitudinal length which is substantially equal to one-half wavelength of a longitudinal sound wave in the material of which the connecting body and dental tool are composed at the resonance operating frequency, said tip section having substantially similar cross-sectional areas at the end portions thereof which are less than one-third the cross-sectional area of said base section and a cross-sectional area intermediate the end portions thereof which is less than the cross-sectional area of said end portions, said tip section having such axial length and relative cross-sectional dimension as to produce flexural vibrations of substantially resonant frequency along the length thereof which corresponds to the resonant frequency of longitudinal vibration of the joined vibrator member, connecting body and dental tool, said tip section having an axial length which is not less than one-quarter of the flexural wave-length in the material of the tip section and having at least one node of flexural vibration between the terminal end of the tip section and the tapered bend portion of the dental tool; the longitudinal vibrations of said connecting body as driven by the energized vibrator member being operative to stimulate combined longitudinal and flexural vibrations of substantially resonant frequency at the terminal end of said tip section with the amplitude of said flexural vibrations not less than one-tenth the amplitude of said longitudinal vibrations.

References Cited in the file of this patent

UNITED STATES PATENTS

| | | |
|---|---|---|
| 1,125,168 | Perkins | Jan. 19, 1915 |
| 2,580,716 | Balamuth | Jan. 1, 1952 |
| 2,651,148 | Carwile | Sept. 8, 1953 |

FOREIGN PATENTS

| | | |
|---|---|---|
| 745,611 | France | Feb. 21, 1933 |